(12) United States Patent
Lane et al.

(10) Patent No.: US 6,381,224 B1
(45) Date of Patent: Apr. 30, 2002

(54) METHOD AND APPARATUS FOR CONTROLLING A FULL-DUPLEX COMMUNICATION SYSTEM

(75) Inventors: John Eugene Lane, Austin, TX (US); Patrick K. Kelly, Toney; Robert V. Holland, Madison, both of AL (US); Garth D. Hillman, Austin, TX (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/282,914

(22) Filed: Mar. 31, 1999

(51) Int. Cl.$^7$ ................................................ H04B 3/20
(52) U.S. Cl. .................... 370/286; 370/986; 379/406.01
(58) Field of Search ................................ 370/276, 282, 370/286, 289, 290, 291, 292, 201; 379/406.01, 406.05, 406.08, 406.09, 406.1

(56) References Cited

U.S. PATENT DOCUMENTS

| | | | |
|---|---|---|---|
| 4,600,815 A | 7/1986 | Horna | 179/170.2 |
| 5,050,160 A | 9/1991 | Fuda | 370/32.1 |
| 5,410,595 A | 4/1995 | Park et al. | 379/410 |
| 5,473,686 A | * 12/1995 | Virdee | 379/410 |
| 5,502,717 A | 3/1996 | Park | 370/32.1 |
| 5,590,241 A | 12/1996 | Park et al. | 395/2.36 |
| 5,612,996 A | 3/1997 | Li | 379/390 |
| 5,796,819 A | * 8/1998 | Romesburg | 379/406 |
| 6,212,273 B1 | * 4/2001 | Hemkumar et al. | 379/410 |
| 6,282,176 B1 | * 8/2001 | Hemkumar | 370/276 |

* cited by examiner

Primary Examiner—Ajit Patel
(74) Attorney, Agent, or Firm—Paul J. Polansky

(57) ABSTRACT

A speakerphone system (50, 70) implements automatic gain control (AGC) when it is in a talk mode. While in the talk mode, the speakerphone system (50, 70) applies a gain factor determined by conventional AGC techniques. The inverse of this gain factor is applied to the received signal to avoid the need to adapt the coefficients of an echo canceller, such as an acoustic echo canceller (AEC) (25), as the volume level changes. The speakerphone system (50, 70) determines whether it is in the talk, double-talk, or listen mode by adaptively changing energy thresholds which define these modes, in dependence on the distribution of ratios of the transmitted energy to received energy. The speakerphone system (50, 70) also varies a loop gain in dependence on the separation between the distribution of energy ratios in the talk mode and in the receive mode. This automatic loop gain adjustment ensures loop stability.

28 Claims, 5 Drawing Sheets

FIG.1 —PRIOR ART—

METHOD AND APPARATUS FOR CONTROLLING A FULL-DUPLEX COMMUNICATION SYSTEM

FIELD OF THE INVENTION

This invention relates in general to signal processing systems, and more particularly to full-duplex communication systems.

BACKGROUND OF THE INVENTION

Recent advances in signal processing technology have allowed the development of new products. One product is the full-duplex speakerphone. Prior technology only allowed half-duplex operation because the proximity between the loudspeaker and the microphone caused positive feedback and echo. However, half-duplex speakerphones are annoying to users because the speakerphone output is muted while the speaker is talking. The party at the other end is unable to interrupt the conversation until the speaker is quiet for a given length of time.

However, signal processing technology is able to measure room acoustics and automatically cancel echo thereby generated. The signal processor typically uses an adaptive finite impulse response (AFIR) filter whose coefficients are weighted in accordance with the room acoustics. Each AFIR filter coefficient is multiplied by an audio input signal sample which is delayed by a predetermined number of samples from the current input signal sample. For example if the room causes an echo 50 milliseconds (ms.) after an input signal, the AFIR filter coefficients for samples delayed by 50 ms. are set to cancel this echo. Thus, the signal processor is able to cancel the echo.

However, full-duplex speakerphones using present signal processing technology have noise problems. One problem is that the echo cancellation process produces noise during operation. Since echoes may be generated up to several hundred milliseconds (ms.) after the input signal for some environments, full-duplex speakerphones typically must implement very long AFIR filters. For example, full-duplex speakerphones typically require approximately 1000 AFIR filter taps for small rooms. More-complex speakerphone systems, such as teleconferencing systems for larger rooms having multiple microphones and speakers, may require as many as 4000 taps. Since the speakerphones must be able to operate in a variety of environments, they are designed for worst case environments having high levels of echo. However, noise increases as the numbers of taps increases, resulting in unnecessary noise increases for small room environments.

Another problem is initialization noise, which is more acute for complex systems such as teleconferencing systems. Before normal operation, the system must initialize the AFIR filter coefficients according to the room acoustics to determine all echo paths. After initialization, the coefficients may be continuously updated. A typical teleconferencing system requires five to twenty seconds of initialization upon power up. During this initialization sequence, the loudspeakers broadcast noise, typically white noise, in order to measure the echo characteristics. Another technique generates a chirp signal instead of white noise. The signal processor generates the chirp by rapidly sweeping all the way from a very low frequency to the Nyquist frequency. Either type of initialization is very annoying to users. Furthermore, the user cannot keep the system continually operational because the adaptive echo cancellation filter coefficients diverge from optimum during long periods of silence.

What is needed then is a new method for use in a full-duplex speakerphone that solves the noise and initialization problems described above. Such a method and a speakerphone system are provided by the present invention, whose features and advantages will be more clearly understood from the following detailed description taken in conjunction with the accompanying drawings.

DETAILED DESCRIPTION OF A PREFERRED EMBODIMENT

Figure 1:
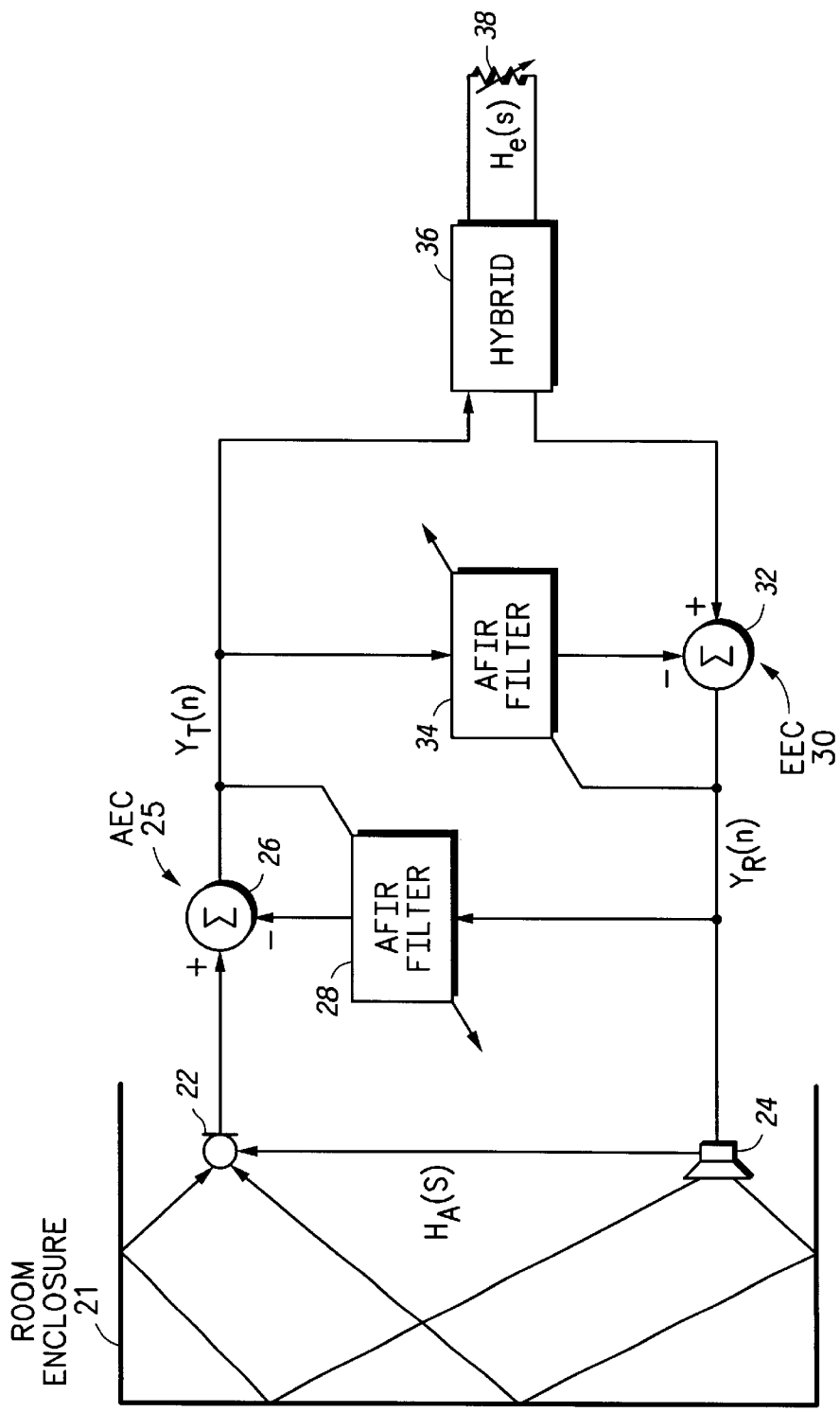
FIG. 1 illustrates in block diagram form a full-duplex speakerphone system known in the prior art.

FIG. 1 illustrates in block diagram form a full-duplex speakerphone system 20 known in the prior art. Speakerphone system 20 includes a microphone 22, a loudspeaker 24, an acoustic echo canceler (AEC) 25, an electrical echo canceler (EEC) 30, a hybrid 36, and an impedance element 38. Microphone 22 is an electromechanical transducer that provides an electrical signal at the output thereof in response to a received acoustic signal. AEC 25 filters this acoustic signal to substantially cancel the echo of the speaker's voice due to the acoustic coupling between loudspeaker 24 and microphone 22. Thus AEC 25 allows the system to operate full-duplex.

AEC 25 includes a summing device 26 and an adaptive finite impulse response (AFIR) filter 28. Summing device 26 has a positive input terminal connected to the output of microphone 22, a negative input terminal, and an output terminal for providing a transmit signal designated "$y_T(n)$". AFIR filter 28 has a reference input terminal, an error input terminal for receiving signal $y_T(n)$, and an output terminal connected to the negative input terminal of summing device 26. Signal $y_T(n)$ has an energy signal associated therewith labeled "$E_T$". Energy signal $E_T$ is equal to the expected value of the square of the transmit signal, and in a typical digital signal processing (DSP) system is estimated by the following formula:

$$E_T(n) = \beta * E_T(n-1) + (1-\beta) * y_T(n)^2 \quad [1]$$

Transmit signal $y_T(n)$ is provided to an input of hybrid 36. Hybrid 36 is a conventional 4-wire to 2-wire telephone line hybrid which is connected via a transmission line to a central office (CO). This transmission line and the termination at the CO can be modeled by a variable impedance 38 having a transfer function labelled "$H_e(s)$" connected between the two terminals on the transmission line side of hybrid 36. An output of hybrid 36 provides a received signal that includes both the signal from the far end and any electrical echoes of the transmitted signal that may be caused by the imperfections in hybrid 36 or the transmission line.

Speakerphone system 20 includes EEC 30 to cancel such echoes. EEC 30 includes a summing device 32 and an AFIR filter 34. Summing device 32 has a positive input terminal connected to the output terminal of hybrid 36, a negative input terminal, and an output terminal for providing a received signal labelled "$y_R(n)$", which has an energy associated therewith labeled "$E_R$". AFIR filter 34 has a reference input terminal connected to the output terminal of summing device 26, an error input terminal for receiving signal $y_R(n)$, and an output terminal connected to the negative input terminal of summing device 32. The output terminal of summing device 32 is connected to the reference input of AFIR filter 28 and to an electrical signal input of loudspeaker 24. Loudspeaker 24 is an electromechanical device that provides an acoustic output that is a representation of the electrical input signal.

The acoustic echo that is present in speakerphone system 20 is represented by various reflection paths of the room enclosure as well as by a direct attack path therebetween. The room characteristics causing the acoustic echo can be modeled as a transfer function labeled "$H_A(s)$" between the acoustic signal provided by loudspeaker 24 and the input of microphone 22. AEC 25 adaptively attempts to offset this acoustic echo, represented by transfer function $H_A(s)$, using coefficients obtained by conventional least-mean-squares (LMS) techniques. Likewise, EEC 30 attempts to cancel the electrical echo through the transmission line by coefficients generated using conventional LMS filtering. Note that typically transfer function $H_e(s)$ is relatively stable during the current call between any given customer premises and the CO to which that telephone line is connected. However, the acoustic echo will vary with different room acoustics, with different positions of the speaker, with the position of different objects in the room, etc. Thus in general the acoustic echo canceller must adapt more frequently.

There are several implementation difficulties associated with speakerphone system 20. First there is a tradeoff between the length and quality of the training interval used to initialize the AFIR filter coefficients, and the discomfort to the user with the training signal. For example, one known training signal is composed of white noise that is typically applied for a period of time on the order of seconds. Another technique applies a chirp signal over a similar period of time. These training signals are annoying to the speaker. If speakerphone system 20 did not generate a training signal and instead allowed the coefficients to adapt naturally during the initial speaking interval, the coefficients may not converge for quite some time, causing speakerphone system 20 to distort the transmitted or received speech during this interval.

There is also a tradeoff that must be made in accommodating different room acoustics. For example, if the initial coefficients are determined for a large room, they will not be optimal when speakerphone system 20 is used in a small room and vice versa. Also, various signal processing functions are performed selectively depending upon whether the person is predominately talking or listening or whether there is a period in which neither the near end nor the far end is actively talking. In making the decision of which mode speakerphone system 20 is in, known systems also pick thresholds which may not be optimal for rooms of all sizes and may also change over time.

Figure 2:
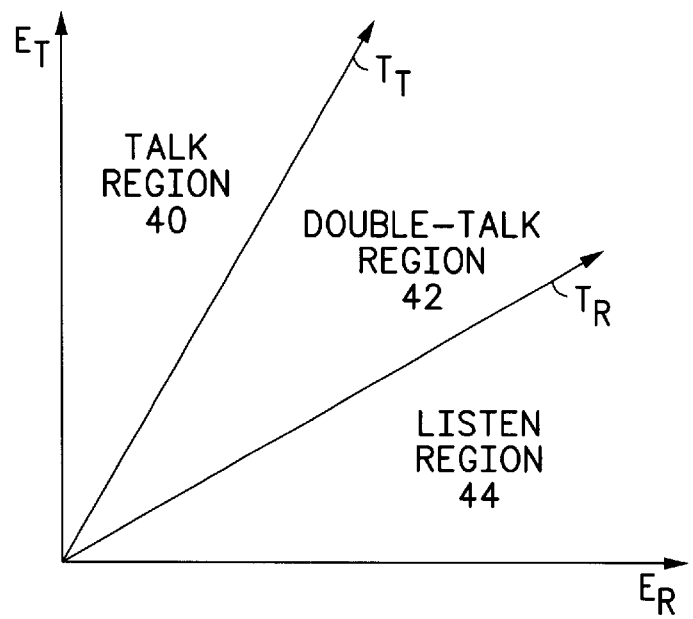
FIG. 2 illustrates a graph depicting the relative transmit and receive energies of the speakerphone system of FIG. 1.

This characteristic is better described with reference to FIG. 2, which illustrates a graph depicting the relative transmit and receive energies. In FIG. 2 the horizontal axis represents the energy level provided to loudspeaker 24 ($E_R$) and the vertical axis represents the energy in the signal from microphone 22 provided to hybrid 36 ($E_T$). Thus a point along the horizontal axis represents the condition in the system in which all the energy is contained in the received signal. Thus the region adjacent to this axis is labeled "LISTEN REGION" 44. Likewise the vertical axis represents those conditions of speakerphone system 20 in which all the energy is due to the input of microphone 22. Thus adjacent to the vertical axis is a region labeled "TALK REGION" 40. LISTEN REGION 44 and TALK REGION 40 furthermore represent all those regions of signal energy which are predominately due to the far end or the near end, respectively. The boundaries of these regions are represented by a first line labeled "$T_T$" which is a threshold of TALK REGION 40 and a second line labeled "$T_R$" which is a threshold of LISTEN REGION 44. Between TALK REGION 40 and LISTEN REGION 44 and bounded by lines $T_T$ and $T_R$ is a region labelled "DOUBLE-TALK REGION" 42. DOUBLE-TALK REGION 42 represents those regions of signal energy in which neither the near-end nor the far-end speaker's energy predominates.

Boundary lines $T_T$ and $T_R$ are defined by a predetermined slope. In known embodiments, these slopes are hard coded and chosen to be optimal across many different configurations in which the speakerphone may be used. However these fixed thresholds create problems in some situations. For example, when the near-end speaker is speaking but at a low signal level due to a low sensitivity of the microphone (i.e. near the origin of FIG. 2), there is some chance that the energy point may be outside of TALK REGION 40 and the speakerphone may incorrectly conclude that the near-end speaker is not talking. Likewise if the far-end speaker is speaking at a low signal level due to a low sensitivity of the microphone, the energy point may be outside of LISTEN REGION 44 and the speakerphone may incorrectly conclude that the far-end speaker is not speaking. What is needed then is a better technique of making the talk, listen, double-talk decisions that takes into account varying system gain conditions.

Figure 3:
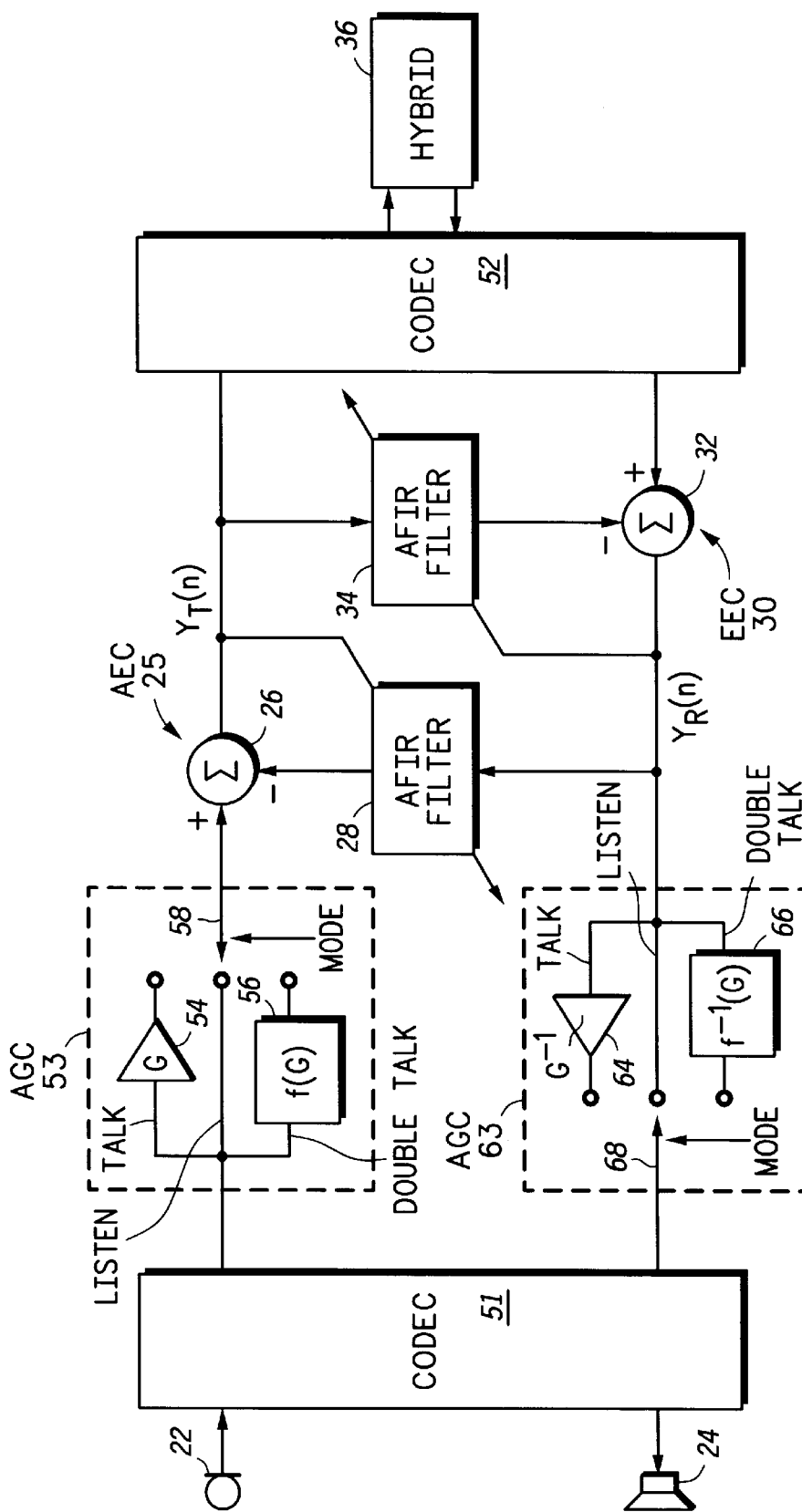
FIG. 3 illustrates a block diagram of a speakerphone system with automatic gain control (AGC) according to the present invention.

FIG. 3 illustrates a block diagram of a speakerphone system 50 with automatic gain control (AGC) according to the present invention. Speakerphone system 50 is similar to speakerphone system 20 of FIG. 1, and like elements are assigned the same reference numbers. As shown in FIG. 3, however, speakerphone system 50 includes a coder-decoder (CODEC) 51 and a CODEC 52 that are needed in an actual system and that are implemented by hardware circuitry. CODEC 51 converts the analog signal received from microphone 22 into a digital signal which may be conveniently processed using digital signal processing techniques. Similarly speakerphone system 50 processes received signal $y_R(n)$ digitally and CODEC 51 converts it into analog form for output by loudspeaker 24. Speakerphone system 50 processes transmit signal $y_T(n)$ digitally and CODEC 52 converts it into analog form for output to hybrid 36. CODEC 52 converts the analog signal received from hybrid 36 into a digital signal which may be conveniently processed using digital signal processing techniques.

On the transmit side speakerphone system 50 includes a transmit automatic gain control (AGC) block 53 which selects one of three possible gains depending upon whether the system is in TALK, DOUBLE-TALK, or LISTEN mode. Transmit AGC block 53 includes a variable gain block 54 and a function block 56. Variable gain block 54 has an input connected to the output terminal of CODEC 51, and an output connected to a first terminal of a one-of-three switch 58, and implements a gain labelled "G". A second terminal of switch 58 is connected directly to the output of CODEC 51. Function block 56 has an input terminal connected to the output terminal of CODEC 51, and an output terminal connected to a third terminal of switch 58, and performs a function on the input thereof labelled "f(G)". Switch 58 selects the first, second or third terminals respectively in response to a signal labelled "MODE" which selects either the TALK, LISTEN, or DOUBLE-TALK mode.

On the receive side speakerphone system 50 includes an inverse AGC block 63 which includes a variable gain block 64 and a function block 66. Variable gain block 64 has an input terminal connected to the output terminal of summing device 32, and an output terminal connected to a first terminal of switch 68, and implements a gain equal to $G^{-1}$. A second terminal of switch 68 is connected directly to the output terminal of summing device 32. Function block 66 has an input terminal connected to the output terminal of summing device 32, and an output terminal connected to a third terminal of switch 68, and performs a function on the input thereof labelled "$f^{-1}(G)$". Switch 68 connects the input terminal of CODEC 51 to the first, second and third terminals thereof respectively in response to the MODE signal indicating the TALK, DOUBLE-TALK, or LISTEN mode.

While in TALK mode, speakerphone system 50 calculates gain G using conventional AGC techniques. According to the present invention, AGC block 53 applies gain G to the input signal and inverse AGC block 63 simultaneously applies inverse gain adjustment $G^{-1}$ to signal $y_R(n)$. The transfer function around the room thus becomes $H_A(S)$ *G*G-1, which is equal to $H_A(s)$. Thus the coefficients of AEC 25 do not need to be adapted when speakerphone system 50 automatically adjusts the gain with changes in the speaking level. In addition the gain around the loop also stays constant, preventing the AGC function from causing loop instability.

When in LISTEN mode, AGC block 53 and inverse AGC block 63 directly pass the input to the corresponding output. Thus speakerphone system 50 performs no automatic gain control function in LISTEN mode.

When in DOUBLE-TALK mode, AGC block 53 adapts the gain by performing a function f(G), which takes into account both the gain and a constant, expressed as:

$$f(G)=(G+1)/2 \qquad [2]$$

Thus in DOUBLE-TALK mode the output of AGC block 53 is equal to the input signal multiplied by f(G) to obtain $y_T(n)$. Likewise the received signal the output of summing device 32 is multiplied by $f^{-1}(G)$ to obtain $y_R(n)$.

Implementing speakerphone system 50 using a conventional digital signal processor requires some adjustment to the f(G) and $f^{-1}(G)$ shown in FIG. 3. For example, many commercially available digital signal processors such as the DSP56300 available from Motorola Inc. implement fractional two's complement arithmetic. In this arithmetic system, the values must each be normalized to be less than one to keep the product thereof less than one. For example the variable gain block may apply a gain factor equal to a quarter of desired gain factor G shown in FIG. 3. The output of AGC block 53 would then be multiplied by four to obtain the correct value of $y_T(n)$ prior to being input to hybrid 36. A similar adjustment would also be performed on the receive side.

Figure 4:
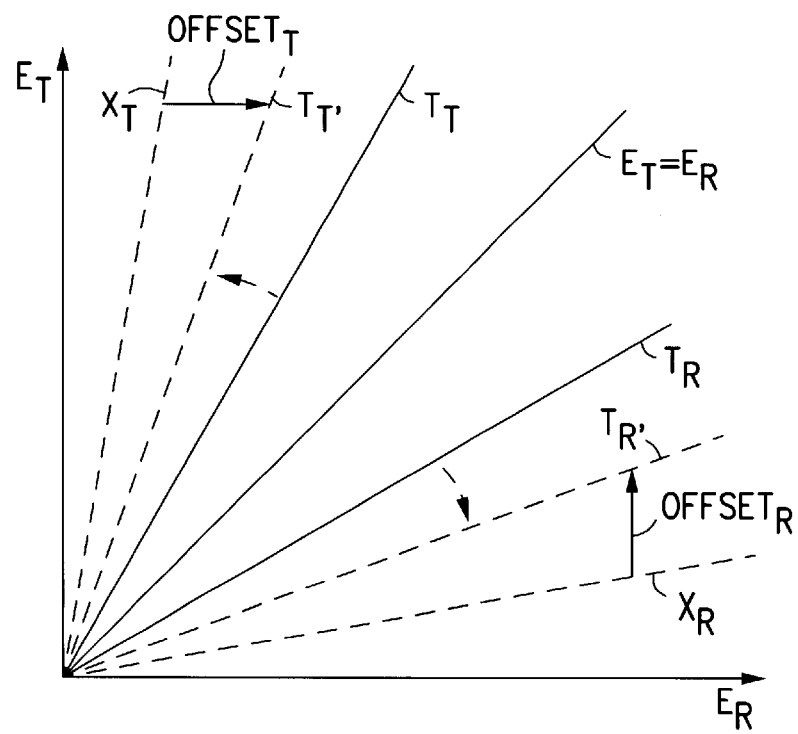
FIG. 4 illustrates a graph of relative energy useful in making the talk, listen, double-talk decision of the speakerphone system of FIG. 3.

FIG. 4 illustrates a graph of relative energy useful in making the TALK, LISTEN, and DOUBLE TALK decisions. As before the horizontal axis represents the energy in the receive signal $E_R$ and the vertical axis represents the energy in the transmit signal $E_T$. Also shown in FIG. 4 is a line at a 45 degree angle (i.e., having a slope of 1) in which the transmit energy is equal to the receive energy, or $E_T=E_R$. Unlike known implementations, the threshold axis is not fixed, but rather is variable in dependence upon signal characteristics. As illustrated in FIG. 4 a first line $T_T$ represents the threshold for the TALK/DOUBLE-TALK decision, and a second line $T_R$ represents the threshold for the DOUBLE-TALK/LISTEN decision, which is measured at a particular point in time. At a subsequent point in time, however, these lines may move into lines labeled $T_T'$ and $T_R'$ which are more optimal placements for the speaking environment at that point in time.

According to the present invention the slopes of these lines are calculated by first determining a value labeled "$X_T$" which represents an average probability of the ratio of transmit energy to receive energy ($E_T/E_R$). $X_T$ is then offset by a predetermined offset to arrive at the slope of the $T_T'$ line. This offset is sufficient to encompass the distribution of recent values of $X_T$. Likewise a value labelled "$X_R$" which represents the average probability of the ratio of the received energy to the transmitted energy ($E_R/E_T$), and the modified threshold $T_R'$ is offset from $X_R$ by a predetermined offset which is sufficient to encompass the distribution of recent values of $X_R$. The factors which affect the desired threshold slope include hybrid matching, differences in microphone characteristics, separation between the microphone and the speaker, the volume that the loudspeaker is set at, and differences in room acoustics. By adaptively changing the threshold, speakerphone system 50 avoids the need to select a threshold that may not be optimal for all combinations and may in fact be much different from the hard coded threshold in some applications.

Figure 5:
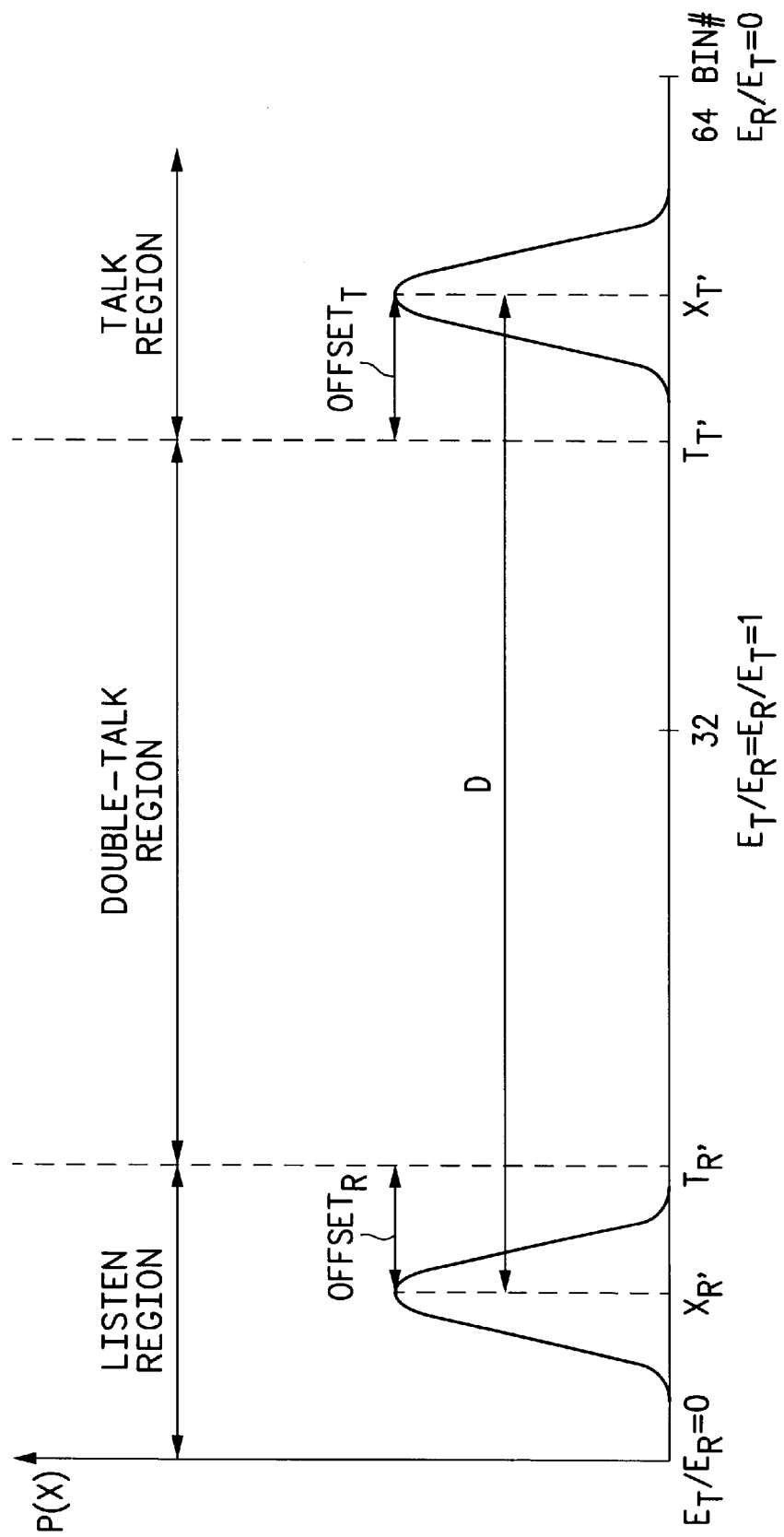
FIG. 5 illustrates a graph of receive and transmit probability ratios of the speakerphone system of FIG. 3.

The measurement of the receive and transmit probability ratios are better understood with reference to FIG. 5, which illustrates a graph of such ratios. In FIG. 5 the horizontal axis represents the relative size of these ratios normalized into 64 different bin numbers, and the vertical axis represents the probability of the energy ratios being in a particular bin, labelled "P(X)". In the illustrated embodiment 64 bins were used, and therefore the center point represents bin 32. The left region represents the LISTENING region, the middle region represents the DOUBLE-TALK region, and the right region represents the TALK region. The leftmost bin represents the condition in which the transmit energy to receive energy ratio is approximately 0, and the rightmost bin represents the condition in which the receive energy to transmit energy ratio is approximately 0. The middle bin, bin 32 represents the condition in which $E_T/E_R=E_R/E_T=1$. The value of $X_R$ shown along the horizontal axis is determined as the center of the probability distribution which is centered thereabout. An OFFSET is added to $X_R$ to obtain $T_R'$ which has a value that encompasses the complete probability distribution of LISTEN energy ratios. Thus if the instantaneous energy is less than $T_R'$ then speakerphone system 50 enters LISTEN mode.

Likewise the distribution of talk energy ratios is centered around $X_T$ but an offset below $X_T$ at $T_T'$ determines the actual TALK threshold. The separation between the two peaks of the energy ratio probabilities is defined as the value D. The histogram bin definitions are defined as follows:

$$X = 32E_T/E_R, \qquad E_T < E_R \qquad [3]$$
$$X = 64 - 32E_R/E_T, \qquad E_T \geq E_R$$

$$P(X') = \beta P(X') + (1-\beta), \qquad X' = X \qquad [4]$$
$$P(X') = \beta P(X'), \qquad X' \neq X$$

Equation [4] is evaluated for X'=0 to 63. The technique can also be expressed in terms of pseudo code as illustrated in Appendix A.

Figure 6:
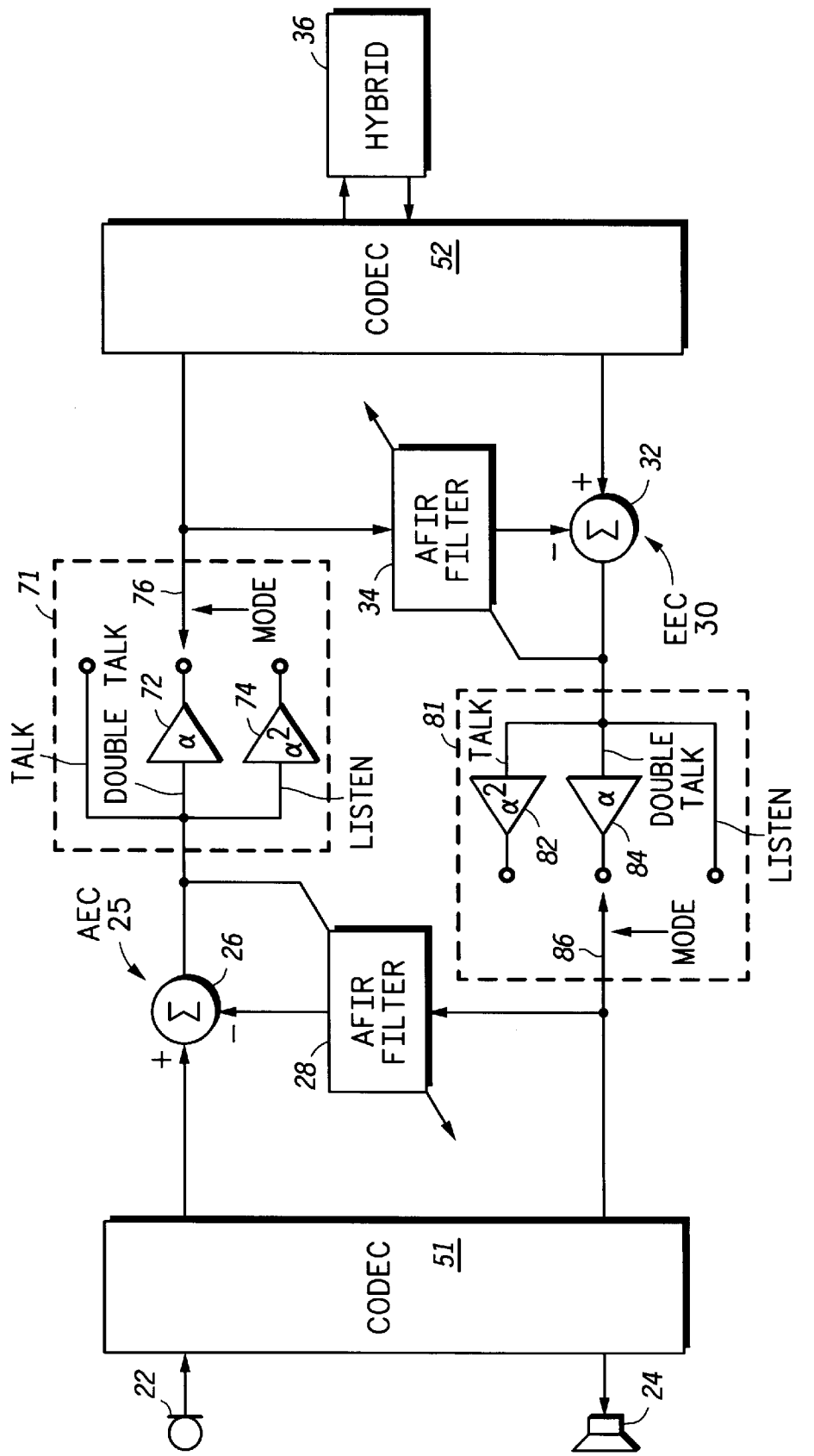
FIG. 6 illustrates a block diagram of a speakerphone system according to another aspect of the present invention.

FIG. 6 illustrates a speakerphone system 70 according to another aspect of the present invention. Elements in common with FIGS. 1 and 3 are assigned like reference numbers. Speakerphone system 70 implements an automatic loop gain control function which uses the TALK, LISTEN, and DOUBLE-TALK decisions of FIGS. 4 and 5 but may use conventional TALK, LISTEN, and DOUBLE-TALK decisions as well. Note that both the automatic loop gain control function of FIG. 6 and the automatic gain control of FIG. 3 may be implemented simultaneously, but adjustments in the coefficients will need to be made as described further below.

Speakerphone system 70 includes a transmit loop gain block 71 and a receive loop gain block 81. Transmit loop gain block 71 includes a gain block 72, a gain block 74, and a switch 76. Switch 76 connects first, second, and third terminals thereof to the input of CODEC 52 in response to the mode signal indicating either the TALK, LISTEN, or DOUBLE-TALK mode, respectively. The first terminal is connected directly to the output of summing device 26. Gain block 72 has an input terminal connected to the output of summing device 26, and an output connected to the second terminal of switch 76 and multiples the input thereof by a gain labeled "$\alpha$" which will be defined further below. Gain block 74 has an input terminal connected to the output terminal of summing device 26 and an output terminal connected to the third terminal of switch 76 and multiples the input thereof by a factor of $\alpha^2$.

Receive loop gain block 81 includes a gain block 82, a gain block 84, and a switch 86. Switch 86 is connected to first, second, and third terminals thereof in response to the mode signal indicating either the TALK, DOUBLE-TALK, or LISTEN mode, respectively. Gain block 82 has an input terminal connected to the output terminal of summing device 32, and an output terminal connected to the first terminal of switch 86. Gain block 84 has an input terminal connected to the output terminal of summing device 32, and an output terminal connected to the second terminal of switch 86. The third terminal of switch 86 is connected directly to the output terminal of summing device 32.

In operation speakerphone system 70 implements automatic loop gain control function which is related to the distance D between the peaks of the energy ratio probabilities as shown in FIG. 5 by the following equations:

$$\alpha = (D - D0)/(64 - D0), \quad D > D0 \qquad [5]$$
$$\alpha = 0 \qquad\qquad\qquad\qquad\quad D \leq D0$$

$$D \equiv X_T - X_R \approx H e^{-1} - H_A \qquad [6]$$

Wherein D0 is a user defined parameter. The condition of stability is:

$$\alpha^2 H_A(s) H_E(s) < 1 \qquad [7]$$

The condition of transmitter/receiver mode detection is:

$$H_A(s) H_E(s) < 1 \qquad [8]$$

Note that in systems in which $H_A(s)H_E(s)$ is greater than one (for example when microphone sensitivity our loudspeaker volume is increased), an additional global loop gain factor may be applied.

Speakerphone system 70 ensures system stability by adjusting the transmit and receive signals by a factor which varies depending upon whether speakerphone system 70 is in the TALK, LISTEN, or DOUBLE-TALK mode. This prevents the peaks of the probability functions from overlapping, which may occur in some systems subject to large amounts of signal reflection and which therefore result in instability. As the distance between the peaks decreases the gain factors increase, which adaptively makes the operation of speakerphone system 70 become more like a half-duplex speakerphone. Thus speakerphone system 70 provides a mechanism to prevent the full-duplex nature of the system from making the loop unstable but only to the extent necessary and thus is able to retain some of the characteristics of a full-duplex speakerphone. And in systems with a large degree of separation between the probability bins, the system behaves essentially as a full-duplex speakerphone.

While the invention has been described in the context of a preferred embodiment, it will be apparent to those skilled in the art that the present invention may be modified in numerous ways and may assume many embodiments other than that specifically set out and described above. For example, the echo cancellers, gain blocks, and other signal processing functions can be performed by software running on a general-purpose DSP, by hardware circuitry, or by a combination thereof. In other embodiments the transmission line hybrid which connects the speakerphone to the wireline telephone system may be replaced by a suitable interface to a wireless network. Accordingly, it is intended by the appended claims to cover all modifications of the invention which fall within the true scope of the invention.

```
Initialize:  X_T = 2 * SF - 2; SF = half the total number of bins (e.g., SF = 32)
             X_L = 1
             PO = threshold value for P(x)
Start:       {P_m, X_m} = max[P(X), {X, 0, 2 * SF - 1 }]
             if P_m < then exit
             D_T = |X_T - X_m|
             D_R = |X_R - X_m|
             if D_T < D_R then
                if X_m < X_T then
                   X_T = β * X_T + (1 - β) * X_m
                else
                   X_T = X_m
                endif
             else
                if X_m > X_R then
                   X_R = β * X_R + (1 - β) * X_m
                else
                   X_R = X_m
                endif
             endif
```

We claim:

1. A method for controlling a full-duplex communication system comprising the steps of:

receiving an input signal from a user input device;

multiplying said input signal by a gain factor selectively if the full-duplex communication system is in a talk mode to provide an adjusted input signal;

cancelling acoustic echo in said adjusted input signal using an adaptive acoustic echo canceller to provide a transmit signal to a transmission device;

receiving a receive signal from said transmission device;

cancelling electrical echo in said receive signal using an adaptive electrical echo canceller to provide an adjusted receive signal;

multiplying the adjusted receive signal by an inverse of said gain factor selectively if the full-duplex communication system is in said talk mode to provide an output signal to a user output device;

determining if the full-duplex communication system is in said talk mode in dependence on said input signal and said receive signal, whereby an adaptation of coefficients in said adaptive echo canceller during periods of changing voice level is minimized.

2. The method of claim 1 further comprising the steps of:

performing a mathematical function which includes a constant on said input signal to provide said adjusted input signal if full-duplex communication system is in a double-talk mode; and performing in inverse of said mathematical function on said adjusted receive signal to provide said output signal if the full-duplex communication system is in said double-talk.

3. The method of claim 2 further comprising the steps of:

providing said input signal as said adjusted input signal if full-duplex communication system is in a listen mode; and providing said adjusted receive signal as said output signal if the full-duplex communication system is in said listen mode.

4. The method of claim 1 further comprising the steps of:

providing said input signal as said adjusted input signal if full-duplex communication system is in a listen mode; and providing said adjusted receive signal as said output signal if the full-duplex communication system is in said listen mode.

5. The method of claim 1 wherein the step of cancelling acoustic echo in said adjusted input signal comprises the step of providing said transmit signal to a four-wire to two-wire telephone line hybrid.

6. The method of claim 1 wherein said step of receiving an input signal from a user input device comprises the steps of:

receiving an analog input signal from said user input device; and converting said analog signal to digital form to provide said input signal.

7. A method for controlling a full-duplex communication system comprising the steps of:

receiving an input signal from a user input device;

performing a selected mathematical operation on said input signal based on a mode of the full-duplex communication system to provide an adjusted input signal;

cancelling acoustic echo in said adjusted input signal using an adaptive acoustic echo canceller to provide a transmit signal to a transmission device;

receiving a receive signal from said transmission device;

cancelling electrical echo in said receive signal using an adaptive electrical echo canceller to provide an adjusted receive signal;

performing an inverse of said selected mathematical operation on said adjusted receive signal based on said mode to provide an output signal to a user output device;

determining said mode of the full-duplex communication system in dependence on said input signal and said receive signal, whereby an adaptation of coefficients in said adaptive echo canceller during periods of changing voice level is minimized.

8. The method of claim 7 wherein said step of determining said mode of the full-duplex communication system comprises the step of determining said mode based on a ratio of energies of said input signal and said receive signal.

9. The method of claim 7 wherein said step of determining said mode of the full-duplex communication system comprises the step of determining whether the full-duplex communication system is in a talk mode, a listen mode, or a double-talk mode.

10. The method of claim 9 wherein said step of performing said mathematical operation on said input signal comprises the step of multiplying said input signal by a gain factor to provide said adjusted input signal if the full-duplex communication system is in said talk mode.

11. The method of claim 9 wherein said step of performing said mathematical operation on said input signal comprises the step of performing a mathematical function which includes a constant on said input signal if the full-duplex communication system is in said double-talk mode.

12. The method of claim 9 wherein the step of performing said mathematical operation on said input signal comprises the step of providing said input signal as said adjusted input signal if the full-duplex communication system is in said listen mode.

13. The method of claim 9 wherein the step of determining whether the full-duplex communication system is in said talk mode, said listen mode, or said double-talk mode comprises the step of varying a threshold axis that defines a boundary between said talk mode and said double-talk mode, in dependence upon said input signal and said receive signal.

14. The method of claim 9 wherein the step of determining whether the full-duplex communication system is in said talk mode, said listen mode, or said double-talk mode comprises the step of varying a threshold axis that defines a boundary between said double-talk mode and said listen mode, in dependence upon said input signal and said receive signal.

15. A full-duplex communication system comprising:

a first automatic gain control circuit having an input terminal for receiving an input signal, a control terminal for receiving a mode signal, and an output terminal for providing an adjusted input signal by performing a selected mathematical operation on said input signal as determined by said mode signal;

an adaptive acoustic echo canceller having a signal input terminal coupled to said output terminal of said first automatic gain control circuit, a feedback input terminal, and an output terminal for providing a transmit signal;

an adaptive electrical echo canceller having a signal input terminal for receiving a receive signal, a feedback input terminal coupled to said output terminal of said adaptive acoustic echo canceller, and an output terminal coupled to said feedback input terminal of said adaptive acoustic echo canceller;

a second automatic gain control circuit having an input terminal coupled to said output terminal of said adaptive electrical echo canceller, a control terminal for receiving said mode signal, and an output terminal for providing an output signal by performing an inverse of said selected mathematical operation on said adjusted receive signal; and a signal processor having a first input for receiving said input signal, a second input for receiving said receive signal, and an output coupled to said first automatic gain control circuit and said second automatic gain control circuit for providing said mode signal based on said input signal and said receive signal.

16. The full-duplex communication system of claim 15 wherein said first automatic gain control circuit comprises:

a gain element having an input terminal for receiving said input signal, and an output terminal;

a function block having an input terminal for receiving said input signal, and an output terminal; and a switch having a first terminal selectively coupled to said output terminal of said gain element, a conductor conducting said input signal, or said output terminal of said function block in dependence on said mode signal, and a second terminal for providing said adjusted input signal.

17. The full-duplex communication system of claim 15 wherein said second automatic gain control circuit comprises:

a gain element having an input terminal for receiving said adjusted receive signal, and an output terminal;

a function block having an input terminal for receiving said adjusted receive signal, and an output terminal; and a switch having a first terminal selectively coupled to said output terminal of said gain element, a conductor conducting said adjusted receive signal, or said output terminal of said function block in dependence on said mode signal, and an second terminal for providing said output signal.

18. A full-duplex communication system comprising:

an adaptive acoustic echo canceller having a signal input terminal for receiving an input signal, a feedback input terminal for receiving an output signal, and an output terminal for providing an adjusted input signal;

a first automatic gain control circuit having an input terminal for receiving said adjusted input signal, a control terminal for receiving a mode signal, and an output terminal for providing a transmit signal by performing a selected mathematical operation on said adjusted input signal as determined by said mode signal;

an adaptive electrical echo canceller having a signal input terminal for receiving a receive signal, a feedback input terminal coupled to said output terminal of said adaptive first automatic gain control circuit, and an output terminal for providing an adjusted receive signal;

a second automatic gain control circuit having an input terminal coupled to said output terminal of said adaptive electrical echo canceller, a control terminal for receiving said mode signal, and an output terminal for providing an output signal by performing an inverse of said selected mathematical operation on said adjusted receive signal; and a signal processor having a first input for receiving said input signal, a second input for receiving said receive signal, and an output coupled to said first automatic gain control circuit and said second automatic gain control circuit for providing said mode signal based on said input signal and said receive signal.

19. The full-duplex communication system of claim 18 wherein said first automatic gain control circuit comprises:

a gain element having an input terminal for receiving said input signal, and an output terminal;

a second gain element having an input terminal for receiving said input signal, and an output terminal; and a switch having a first terminal selectively coupled to a conductor conducting said adjusted input signal, said output terminal of said first gain element, or said output terminal of said second gain element in dependence on said mode signal being in first, second, or third states, respectively, and a second terminal for providing said transmit signal.

20. The full-duplex communication system of claim 19 wherein said second automatic gain control circuit comprises:

a first gain element having an input terminal for receiving said adjusted receive signal, and an output terminal;

a second gain element having an input terminal for receiving said adjusted receive signal, and an output terminal; and a switch having a first terminal selectively coupled to said output terminal of said first gain element, said output terminal of said second gain element, or a conductor conducting said adjusted receive signal in dependence on said mode signal being in said first, second, or third states, respectively, and an second terminal for providing said output signal.

21. The full-duplex communication system of claim 20 wherein said mode signal is in said first state, said second state, or said third state if the full-duplex communication system is in a talk mode, a double talk mode, or a listen mode, respectively.

22. The full-duplex communication system of claim 21 in which:

a gain factor of each of said first gain element of said first automatic gain control circuit and said second gain element of said second automatic gain control circuit is equal to a value of $\alpha$; and a gain factor of each of said second gain element of said first automatic gain control circuit and said first gain element of said second automatic gain control circuit is equal to a value of $\alpha^2$;

whereby a loop gain factor of an audio signal around a complete loop is equal to $\alpha^2$ regardless of whether the full-duplex communication system is in said talk mode, said listen mode, or said double talk mode.

23. The full-duplex communication system of claim 22 wherein said value $\alpha$ is derived from a difference between an average of transmit energy to a receive energy of a plurality of samples of said receive signal, and an average of receive energy to transmit energy of a corresponding plurality of samples of said receive signal.

24. A method for processing signals in a full-duplex communication system comprising the steps of:

receiving continuously a transmit signal from an input device and a receive signal from a transmission device;

determining an average probability of a ratio between a transmit energy of a plurality of samples of said transmit signal and a receive energy of a corresponding plurality of samples of said receive signal;

offsetting said average probability by a predetermined offset to arrive at a threshold value;

determining whether a ratio of a transmit energy of one sample of said transmit signal to a receive energy of a corresponding sample of said receive signal is greater than or less than said threshold value; and performing a predetermined signal processing operation on at least one of said transmit signal and said receive signal selectively in dependence on said step of determining.

25. The method of claim 24 wherein said step of performing said predetermined signal processing operation comprises the step of multiplying said input signal by a predetermined gain factor in dependence on said step of determining.

26. The method of claim 25 wherein said step of performing said predetermined signal processing operation further comprises the step of multiplying said receive signal by an inverse of said predetermined gain factor in dependence on said step of determining.

27. The method of claim 24 wherein said step of performing said predetermined signal processing operation comprises the step of performing a mathematical function which includes a constant on said input signal in dependence on said step of determining.

28. The method of claim 21 wherein said step of performing said predetermined signal processing operation further comprises the step of performing an inverse of said mathematical function on said receive signal in dependence on said step of determining.

* * * * *